United States Patent
Bernstein et al.

(10) Patent No.: US 7,158,982 B2
(45) Date of Patent: Jan. 2, 2007

(54) DECLARATIVE, DATA-NEUTRAL CLIENT-SERVER DATA TRANSPORT MECHANISM

(75) Inventors: Keith Bernstein, San Francisco, CA (US); Robert Kieffer, San Francisco, CA (US)

(73) Assignee: America Online, Inc., Dulles, VA (US)

( * ) Notice: Subject to any disclaimer, the term of this patent is extended or adjusted under 35 U.S.C. 154(b) by 159 days.

(21) Appl. No.: 10/203,050

(22) PCT Filed: Feb. 5, 2001

(86) PCT No.: PCT/US01/03663

§ 371 (c)(1),
(2), (4) Date: Apr. 21, 2003

(87) PCT Pub. No.: WO01/57737

PCT Pub. Date: Aug. 9, 2001

(65) Prior Publication Data

US 2004/0181532 A1 Sep. 16, 2004

(51) Int. Cl.
G06F 17/00 (2006.01)
G06F 17/30 (2006.01)
(52) U.S. Cl. .............................. 707/101; 707/3; 707/10
(58) Field of Classification Search ............. 707/1–10, 707/100–104.1, 200–206; 709/201–203, 709/217–219, 230
See application file for complete search history.

(56) References Cited

U.S. PATENT DOCUMENTS

| | | | |
|---|---|---|---|
| 5,860,070 A * | 1/1999 | Tow et al. ..................... | 707/8 |
| 5,899,990 A | 5/1999 | Maritzen et al. ............... | 707/4 |
| 5,999,941 A | 12/1999 | Andersen ..................... | 707/103 |
| 5,999,990 A | 12/1999 | Sharrit et al. .................. | 710/8 |
| 6,065,016 A * | 5/2000 | Stuntebeck et al. ......... | 707/200 |
| 6,292,800 B1 * | 9/2001 | Eldreth ......................... | 707/10 |
| 6,480,860 B1 * | 11/2002 | Monday ..................... | 707/102 |
| 6,601,098 B1 * | 7/2003 | Case et al. .................. | 709/224 |

OTHER PUBLICATIONS

Hu, J., et al; *A Generic Web to Database Interface Building Tool*; Sep. 9, 1996; Proceedings; IEEE 1996, pp. 285-290.

* cited by examiner

Primary Examiner—Joon Hwan Hwang
(74) Attorney, Agent, or Firm—Michael A. Glenn; Glenn Patent Group

(57) ABSTRACT

The invention provides a solution to client-server data handling tasks, such as, transport and data manipulation, by keeping the middleware ignorant of the specific semantics of the data and makes it instead a "dumb" or "blind" transport conduit between the client and the data base. Conversely, the invention provides the client with a mechanism to manipulate the database data without the middleware understanding the type or structure of the data that is being acted upon. This flows easily with the functioning of the client and the database, which is, to move the data back and forth from one to the other, with the client accepting the data from the user and displaying the database data to the user.

20 Claims, 9 Drawing Sheets

| Name | Assignable? | Type on Server | Owner | Description |
|---|---|---|---|---|
| com.iamaze.pres entation.SXPres entation_123456 789(e.g.) | No | SXPresentation | None. This is a "root" object. | Long value, supplied in String form, which specifies the id of the presentation in the database. |
| slides | No | ArrayList | SXPresentation | An array containing an ordered list of objects, each of which encapsulate a single "slide" of a presentation. Though it is not directly "assign"able, objects within it may be assigned. This field can also be used with insert to create a new slide. |
| slides[3] (e.g.) | Yes | SXSlide | "slides" ArrayList | A numeric index into an array of objects each of which encapsulate a single "slide" of a presentation. |
| layoutName | Yes | String | SXSlide | A string indicating the name of the layout associated with a particular slide. Note: After creating a new slide, this field must be assigned a value for the slide to be renderable. |
| contentEntities | No | HashMap | SXSlide | A HashMap with content names as the "keys" and the actual contentEntity as the value. |
| ContentNameN | No | SXText, SXImage, or SXOutline | "contentEntitie s" HashMap | A container object for properties of this type of content object. |

*FIG. 2*

| Name | Assignable? | Type On Server | Owner | Description |
|---|---|---|---|---|
| text | Yes | String | SXText | The user-visible text associated with this item. |
| url | Yes | String | SXText | URL to navigate to if the entity is clicked (e.g. "http://www.foobar.com/..."). |
| align | Yes | String | SXText | Horizontal alignment.<br>One of "left", "center", or "right". |
| verticalAlign | Yes | String | SXText | Vertical alignment.<br>One of "top", "middle", or "bottom". |
| color | Yes | String | SXText | Color of the text.<br>Standard HTML color value (e.g. "#55AAC0" or "green"). |
| fontSize | Yes | String Integer | SXText | The font point size.<br>This is a String which represents and integer value. |
| fontFamily | Yes | String | SXText | Comma-delimited list of font names or "null" for default. |
| fontStyle | Yes | String | SXText | "italic" or "null" for default. |
| fontWeight | Yes | String | SXText | "bold" or "null" for default. |
| type | No | String | SXText | "SXText"- Indicates what kind of object this contentEntity is. |
| width | No | String | SXText | e.g. "90%" or 90 [pixels] |
| height | No | String | SXText | e.g. "90%" or 90 [pixels] |
| top | No | String | SXText | e.g. "10%" or 10 [pixels] |
| left | No | String | SXText | e.g. "10%" or 10 [pixels] |

FIG. 2
(Cont'd)

| Name | Assignable? | Type On Server | Owner | Description |
|---|---|---|---|---|
| src | Yes | String | SXImage | URL specifying the location of the image (e.g. "http://www.foobar.com/foo.gif") |
| url | Yes | String | SXImage | URL to navigate to if the entity is clicked (e.g. "http://www.foobar.com/..."). |
| scale | Yes | String | SXImage | "true" to scale image, "null" for fixed (static) size. |
| align | Yes | String | SXImage | Horizontal alignment. One of "left", "center", or "right". |
| verticalAlign | Yes | String | SXImage | Vertical alignment. One of "top", "middle", or "bottom". |
| type | No | String | SXImage | "SXImage"- Indicates what kind of object this contentEntity is. |
| width | No | String | SXImage | e.g. "90%" or 90 [pixels] |
| height | No | String | SXImage | e.g. "90%" or 90 [pixels] |
| top | No | String | SXImage | e.g. "10%" or 10 [pixels] |
| left | No | String | SXImage | e.g. "10%" or 10 [pixels] |

| Name | Assignable? | Type On Server | Owner | Description |
|---|---|---|---|---|
| bulletType | Yes | String | SXOutline | The type of bullets to place on outline nodes. One of "string", "number", or "image" |
| bulletValue | Yes | String | SXOutline | Dependent on "bulletType" (above).<br>• String prefix if "string" type<br>• Starting number if "number" type<br>• URL pointing to image if "image" type |
| type | No | String | SXOutline | "SXOutline"- Indicates what kind of object this contentEntity is. |
| All other SXText fields (they are inherited) | See SXText | See SXText | SXOutline | "SXOutline"- Indicates what kind of object this contentEntity is. |

FIG. 2
*(Cont'd)*

| URL Command | Param1 | Param2 | Description |
|---|---|---|---|
| alias | AliasName | AliasSubstitutionString Value (quoted) | Use to substitute any part of subsequent commands' parameter text with an alias while processing the remainder of the commands in this URL. Aliases are only valid while the URL they are defined in is being processed.<br>Aliases may not be recursive (self-referential).<br>Subsequent aliases can redefine previous aliases, and will apply to the remaining commands.<br>Use of the ".", "[", or "]" characters is illegal in alias names.<br>Returns an SC_NO_CONTENT response to the client. |
| assign | TargetObject.Address [index-or-name] | SourceObject.Address, "QuotedStringValue", "null", or null | Overwrites the specified target object's existing value with the specified source object or quoted string value.<br>See the "Addressing" section (10.6) for details.<br>Returns an SC_NO_CONTENT response to the client. |
| insert | TargetObject.Address | com.iamaze....SXObje | Can also be considered a "new". |

FIG. 3

| | | | |
|---|---|---|---|
| | s[index-or-name] | atType (quoted) | Initiates an object of the type specified by Param2 and inserts it into the specified index of targetObject. Use "Addressing" section (10.6) for details on Addresses.<br>This command will fail if the target object is not an ArrayList or HashMap type.<br>If the target is an ArrayList, specifying an index of "-1" indicates that the new item be inserted after all others, also all objects appearing after "index" in TargetObject will be moved "down" (their indexes will increase).<br>When inserting items in a HashMap, if the specified "key" already exists in the target HashMap, the old value will be overridden by the new value.<br>Returns an SC_NO_CONTENT response to the client. |
| remove | TargetObject.Address[index-or-name] | None | Removes the value at "index" from targetObject. See "Addressing" section for details on Addresses.<br>This command will fail if the target object is not an ArrayList or HashMap type.<br>If the target is an ArrayList, all objects appearing after "index" in TargetObject will be moved "up" (their indexes will decrease).<br>This command takes only one parameter.<br>Returns an SC_NO_CONTENT response to the client. |
| move | TargetObject.Address[targetIndex] | SourceObject.Address[sourceIndex] | Equivalent of doing a remove(SourceObject.Address[sourceIndex]) followed by an Insert(TargetObject.Address[targetIndex, SourceObject.Address[sourceIndex]]) command, with one difference: In the ArrayList case, "newIndex" is based on pre-"remove" indices. In the HashMap case "move" is effectively a remove of the object with the specified "key", followed by an insert.<br>If one or more of the "tail" components of "TargetObject.Address" do no exist, an attempt will be made to create them.<br>This command will fail if the target object is not an ArrayList or HashMap type (as is true in the "remove" command, as well).<br>Returns an SC_NO_CONTENT response to the client. |
| duplicate | TargetObject.Address[index-or-name] | SourceObject.Address[index-or-name] | TargetObject.Address[index-or-name] may be any of: ArrayList, HashMap, SXPropertyHolder.<br>The object refered to by SourceObject.Address[index-or-name] will be duplicated ("cloned") and the resulting "clone" will be assigned to TargetObject.Address[index-or-name] using the same semantics as if it had been assigned to that target using the "assign" command.<br>Additionally, the object referred to by SourceObject.Address[sourceIndex] must implement the "Cloneable" interface so that it may be copied.<br>Returns as SC_NO_CONTENT response to the client. |

FIG. 3
*(Cont'd)*

| URL Command | Param1 | Param2 | Description |
|---|---|---|---|
| redirect | URLString (quoted) | None | URLString specifies a quoted string which the client wants the browser to redirect it to. The reason the client can't simply "go" to that URL itself, is that it likely does not want to go to that new page until other commands have been completed (e.g. "add slide"), so it needs the server to initiate the move to the new URL. The command takes only one parameter. NOTE: This is currently the only command which will cause a response to be sent to the client, which will, in turn, cause the client to refresh its page (i.e. it sends real HTML content back). All other commands return an SC_NO_CONTENT response. If "URLString" is "null", or the "empty" string, this method will simply refresh (send down the content of) the current URL request. |
| comment | Comment string (quoted) | None | The command processor completely ignores this command, making it useful for callers to use to document/debug the command "packets" they send to the server. This command takes only one parameter. Returns an SC_NO_CONTENT response to the client. |
| log | Logger "Level", one of: INFO_LEVEL, WARNING_LEVEL, ERROR_LEVEL, TIMING_LEVEL | Log message (quoted) | Parameter 1 is unquoted, parameter 2 is a quoted string. This command corresponds to the server-side "SXLogger.logXXX()" methods. The "category" is "SXClientCommand". The message will be logged when the command is processed. Returns an SC_NO_CONTENT response to the client. |
| Token replacement within commands | Token to replace | None | Insert token (e.g. "@FooBar@") indicating that the client expects that when the server sees these tokens it will replace the tokens (via SXClientCommand API) with dynamically generated values on the server side. One example of this in HTTP is the uploading of a file, and the assignment of the filename to a server side model object |
| *NOTES | [1]The command name (opcade) and each of the arguments should appear with the syntax described in section Error! Reference source not found., e.g. commands= "insert (TargetObject.SomeProperty[index], SourceObject.SomeProperty);" [2]Multiple commands may be present in a single command list. Each command in the command list should be separated by a semi-colon (;). | | |

FIG. 3
*(Cont'd)*

*Examples*

*assign & log-* Change the alignment of an "Image3" content entity on slide 1 in presentation com.iamaze.presentation.SXPresentation_123456789 to be right-aligned:
    commands= "assign(com.iamaze.presentation.SXPresentation_123456789.slides [0].contentEntities[Image3].align, "right"); log(INFO_LEVEL. Just sent a command to assign right alignment to an image);"

*insert & assign-* Add a new slide to the very end of presentation com.iamaze.presentation.SXPresentation_123456789, and set it's layoutName to Layout3.htm (involves two commands sent together):
    commands= "insert(com.iamaze.presentation.SXPresentation_123456789.slides[ -1], SXSlide); assign(com.iamaze.presentation.SXPresentation_123456789.slides[- 1].layoutName, "Laoyut3.htm");"

*alias & assign-* Make an alias for the Text2 content entity in slide 2, and then change some of its attributes using the alias:
    commands= "alias(text2, com.iamaze.presentation.SXPresentation_123456789.slides[1]. contentEntities[Tex t2]);assign(text2.text, "this is text item two");assign(text2.color, "green");assign(text2.fontStyle, "italic")"

*remove & comment-* Remove the 2nd "top-level" element in Outline2, and explain why (note that "right" is actually the second parameter... not that it matters, but...):
    commands= "remove(com.iamaze.presentation.SXPresentation_123456789.slide s[1].contentEntities[Outline2].nodes[1]);comment(we do this because we want to get rid of the item, right?);"

*move within a single ArrayList-* Move the 3rd item in Outline2 to be the last item in Outline2:
    commands="move(com.iamaze.presentation.SXPresentation_123456789.slides[ 1].contentEntities[Outline2].nodes[-1], com.iamaze.presentation.SXPresentation_123456789.slides[1].contentEntities[Out line2].nodes[2]);"

*move from one ArrayList to another-* Move the 3rd item in Outline2 to be the 2nd item in the subnode at Outline2's index 4:
    commands= "move(com.iamaze.presentation.SXPresentation_123456789.slides[ 1].contentEntities[Outline2].nodes[1]. com.iamaze.presentation.SXPresentation_123456789.slides[1].contentEntites[Out line2].nodes[2]);"

*move from one HashMap to another-* Move the content entity named "Text3" in slide 2's "contentEntities" array to be a contentEntity named "Text2" in slide 3:
    commands="move(com.iamaze.presentation.SXPresentation_123456789.slides[ 2].contentEntities[Text2], com.iamaze.presentation.SXPresentation_123456789.slides[1].contentEntities[Tex t3]);"

FIG. 3
*(Cont'd)* move from one ArrayList to another, automatically creating missing address containers- Move the 3rd item in Outline2 to be the one and only element in a brand new subnode at Outline2's index 4:

1.commands= "move(com.iamaze.presentation.SXPresentation_123456789.slides[ 1].contentEntities[Outline2].nodes[3].nodes[-1]. com.iamaze.presentation.SXPresentation_123456789.slides[1].contentEntities[Out line2].nodes[3]);"

duplicate slide #3 in an ArrayList and cause the client to show (redirect to) the newly duplicated slide, which was automatically inserted after slide #3, as slide #4:

commands= "duplicate(com.iamaze.presentation.SXPresentation_123456789.sli des[2]);redirect(http://localhost/servlet/RunPresentation?presentationID=123456 789&slideID=3);"

redirect the browser to the same client page that made the request, causing the client's current page to be "refreshed". In this example an images "SRC" changes and the client wants to force the browser to load the newly assigned image, so it forces the browser to a full page refresh.

commands=" assign(com.iamaze.presentation.SXPresentation_123456789.slides[0].contentEntit ies[Image1].src, "http://localhost/media/samples/hd_flhrci.jpg"):redirect(null);"

*FIG. 3*
*(Cont'd)*

DECLARATIVE, DATA-NEUTRAL CLIENT-SERVER DATA TRANSPORT MECHANISM

A portion of the disclosure of this patent document contains material that is subject to copyright protection. The copyright owner has no objection to the reproduction by anyone of the patent document or the patent disclosure, as it appears in the Patent and Trademark Office file or records, but otherwise reserves all copyright rights whatsoever.

This patent application incorporates by reference the material contained in the "Computer Program Listing Appendix Copy 1" and the identical duplicate "Computer Program Listing Appendix Copy 2", entitled "IAMA0001.DOC", created on Nov. 10, 2004, and containing 1.4 Megabytes of data.

TECHNICAL FIELD

The invention relates to a computer mediated method and apparatus for data-neutral robust communication between client and server software in a standard client-server environment. The communication involves data being delivered from the server-side data base to the user for display, and conversely, the delivery of modified or unmodified data from the client-side to the server-side using the currently available software, such as, the Java transcript.

DESCRIPTION OF THE PRIOR ART

The World Wide Web is a graphical interface that overlays the Internet. The Internet is a collection of interconnected, autonomous data communication networks, which spans the globe. The World Wide Web or the Web is a graphical hypertext-based interface that enables users to move quickly between Web sites and Web documents, also known as Web pages, on the Internet by following the links to the other Web documents or Web sites (Web pages) embedded within a Web document (Web page).

A Web document may contain many forms of information, including text, graphics, video, audio, and links to other Web documents anywhere in the world. Presently, Hypertext Mark-up language (HTML) is the standard format for documents on the Web. An HTML formatted document has HTML codes which is a set of commands embedded in the document.

A software application known as Web browser is used to access documents on the Web. By understanding the HTML, Web browser software can properly display a Web document on a user's output display device. A user at a computer system executing a Web browser software application can access information in the form of Web documents or pages on the Web. The information may reside on the same or different computer system or systems. More importantly, Web browser software interprets the HTML commands in an HTML formatted Web document to navigate a link in that Web document to another Web document. The Web browser thereby provides automatic access to other Web documents on the Web.

A server on the Web serves, or publishes, Web documents over the Web. The documents are available to a user who accesses the server from a client executing Web browser application software. The server and client communicate using a communications protocol. Typically, a server and client communicate over a data communication network underlying the Web using an International Standards Organization (ISO) Open Systems Interconnection (OSI) Application layer protocol such as Hyper Text Transfer Protocol (HTTP). The Application layer protocol provides a method of communicating ASCII-based, HTML-formatted information comprising a Web document published by a server. The Web document is transmitted over a data communications network to a client upon request from the client. The HTTP protocol, uses the services of a standard set of OSI transport-layer and Network-layer data communication protocols such as the Transport Control Protocol/Internet Protocol (TCP/IP) suite of data communication protocols. This model is often referred to as a client-server computing model, in which one or more clients access or query a server over a data communication network.

A client on the Web is comprised of a computer system executing Web browser application software. The client communicates with the server using HTTP, but must understand HTML as well, so that, among other things, upon receiving an HTML document from the server, the client knows how to display the document on an attached output display device. A server running the HTTP, i.e. a HTTP server receives a request from a client for a particular HTML document. The HTTP server scans its file system directory in search of the data files or files storing the HTML document. Upon locating the file or files in the file system, the HTTP server transmits the contents of the file using the HTML. Thus, the HTTP server has no knowledge, and, in fact, needs no knowledge of the content or format of the HTML document to transmit, the HTML document to the client over the data communication network.

A server running the HTTP, i.e. an HTTP server receives a request form a client for a particular HTML document. The HTTP server scans its file system directory in search of the data files or files storing the HTML document. Upon locating the file or files in the file system, the HTTP server transmits the contents of the file using the HTTP. Thus, the HTTP server has no knowledge, and in fact needs no knowledge, of the content or format of the HTML document to transmit the HTML document to the client over the data communication network. A disadvantage in the above approach is that the contents of the HTML document are static. In other words, the contents of the HTML document do not change once created by an editor until such time as the document is directly modified by a user via an editor.

In virtually all user-interactive software models in general, the client software is the only component which knows what to do with both application data and user data. Its job is to display server-side database data to the user on the client machine, as well as taking user data or the input data from the client-side machine and delivering that data to the database. In this model, both the client software and the database contain objects which are essentially "bags" of data, with each datum being bound to a particular "field" or named data model attribute.

There are two primary types of data handling requirements in this model, and one secondary type. The first being data transport, the second data manipulation, and the third, particular to the HTTP protocol, is a mechanism for transporting this data within the narrow request/response features of the HTTP internet protocol used by Internet Web browsers for communicating with server-side computers. In existing client-server software models, a middle tier (a software layer, a Java servlet in this implementation) of software is required which understands both the way the database handles and stores data, as well as how the client understands and stores the same data. The middleware (servlet) acts as a conduit from the client to the server-side database, and vice versa. The middleware must also be able to carry out client requests for database data manipulation.

The first type of data handling, data transport, provides a mechanism to move data back and forth between the client and the server. Unfortunately existing client-server communication protocols (including the HTTP protocol used in this implementation of this invention) do not provide a mechanism for the client to write arbitrary data to the server-side database, nor does it provide for the client to directly query the database for arbitrary data. Instead, the middle-tier must understand both the client representation of data and the format it is provided in, as well as understanding the database representation of data and the way in which it is to be stored.

The second type of data handling involves manipulating data in the database based on client requests. This handling normally involves a fairly common set of actions such as data value assignment, data deletion, data creation (instantiation), etc. In currently available models, the client communicates with the middle-tier in very specific, non-generic ways, in order to accomplish these database manipulations.

Unfortunately this paradigm makes the mistake of adding special-case data manipulation logic to the middleware (servlet) to facilitate moving data from the client into the server database and from the data base to the client. It is unfortunate because it means that the middleware, which otherwise would be blind conduit of data between the database and the client, and blink executioner of data base instructions, would suddenly need to understand these client data structures, e.g. it would need to know that an object has sub items stored as a list and so forth.

There would also need to be special commands given by the client to the middleware telling it to move an item, or remove an item. As the data model grows over time and additional data types are required by the client, it requires that the client, the data base, and the server middleware all be constantly updated to remain synchronized with regard to the number and types of data used by the client. This is a cumbersome task which is fraught with errors and bugs do largely to the fact that each layer in the model must understand the specific design of the data.

The middleware would also have to implement frequent "special" case code to handle changes to data. Finally, the prior art model requires that the middleware provide data manipulation facilities unique to each data type. Such actions need to constantly be modified and upgraded as new data is added by the client or the database.

SUMMARY OF THE INVENTION

The invention describes solutions to the client-server data handling tasks such as, transport and data manipulation by keeping the middleware ignorant of the specific semantics of the data and makes it instead a "dumb" or "blind" transport conduit between the client and the data base. Conversely, the invention provides the client with a mechanism to manipulate the database data without the middleware understanding the type or structure of the data that is being acted upon. This flows easily with the functioning of the client and the database, which is, to move the data back and forth from one to the other, with the client accepting the data from the user (not shown) and displaying the database data to the user, and the database storing the client data or any data.

To enable a self-contained manipulation of contents, the client, the middleware, and the database all handle the data without any intricate knowledge of the data. The invention uses a common vocabulary with which to map various attributes to their owning model object.

The mechanism of data transport involves the task of matching the key value pairs or data pairs provided by the client with the key value pairs stored in the server and conversely matching the key value pairs stored in the server to the key value pairs provided by the client.

Additionally, when transporting the data from the database to the client, the server uses a generic utility to create data structures that the client can understand. This utility knows nothing about the type of data it handles except for the reason that it holds a set of key value pairs.

The utility involved in this invention is a client enabled Document Object Model (DOM) written in Java Script. The Java script generation routine blindly "walks" the database data tree and requests each object for its key value. It then creates a String representation of the data and includes it in every page sent down to the client.

The data handling must provide a mechanism which allows the client to modify or add or remove data form the database. The invention solves this problem by using a generic set of commands and a generic, data-neutral, data addressing or assignment scheme which allows all data to be treated opaquely.

BRIEF DESCRIPTION OF THE DRAWINGS

FIG. 2 is a tabular representation giving example of the model objects used in the implementation of the invention; and FIG. 3 is a tabular representation of the data in specific command syntax, the addressing scheme to refer to the data within the commands and examples of some actual commands.

DETAILED DESCRIPTION

Figure 1:
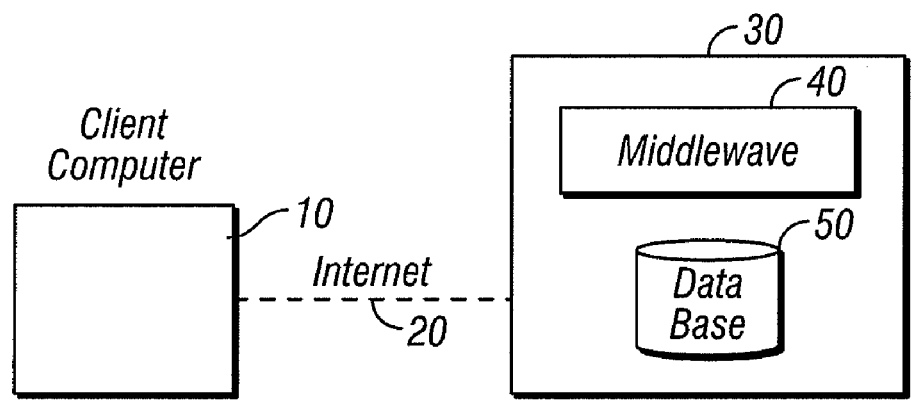
FIG. 1 is an Illustration of the client-server data handling tasks, such as, transport and data manipulation using a preferred embodiment of the invention.

APPENDIX A is a source code in JavaScript showing an implementation of the invention. The invention describes solutions to the client-server data handling tasks such as, transport and data manipulation by keeping the middleware 40 (also called servlet), as in FIG. 1, ignorant of the specific semantics of the data and makes it instead a "dumb" or "blind" transport conduit between the client 10 and the data base 50. Conversely, the invention provides the client 10 with a mechanism to manipulate the database data 50 without the middleware 40 understanding the type or structure of the data that is being acted upon. This flows easily with the functioning of the client 10 and the database 50, which is, to move the data back and forth from one to the other, with the client 10 accepting the data from the user (not shown) and displaying the database data 50 to the user, and the database storing the client data 10 or any data. The client data 10 or the database data 50, according to the invention are generic, also named as "opaque bags" of key value pairs, where the "keys" have the "attribute names", and the "values" have a current state of each datum. This is similar to the general software data structure called a "HashMap" well known in the art. The specific implementation of this invention, described here, appears very similar in structure to a HashMap with the exception that the invention also provides a self-contained manipulation code for its contents.

To enable a self-contained manipulation of contents, the client, the middleware, and the database all handle the data without any intricate knowledge of the data. The invention uses a common vocabulary with which to map various attributes to their "owning" model object. This information is used to provide a coherent view of the database data to the client, as well as for the database to create the appropriate database structures within which to store and retrieve the data efficiently. This map is provided in a single location in server side and is utilized by both the client and the server as a description similar to a Document Type Definition (DTD) in HTML/SGML/XML as is well known in the art.

In a particular implementation of this invention, a command model is used wherein the command model "SXPersistentPropertyHolder" is used as an object which represents the opaque "bag" of data stored on the server and sent to the client. In this implementation, the only types of data the command processor "understands" are SXPersistentPropertyHolder, HashMap, and ArrayList. FIG. 2 gives an example of the model objects used in the implementation of the invention. They are in no way required by it and implementers may very well have their own set of model objects. These objects serve as examples of model objects.

The mechanism of data transport involves the task of matching the key value pairs or data pairs provided by the client with the key value pairs stored in the server and conversely matching the key value pairs stored in the server to the key value pairs provided by the client. To allow for the transport of neutral or opaque data objects, the middleware (servlet) need only receive a "bag" of such data from the client and hand it to the database's prescribed format (also called HashMaps as is well known in the art). Additionally, when transporting the data from the database to the client, the server utilizes a generic utility to create data structures that the client can understand. This utility knows nothing about the type of data it handles except for the reason that it holds a set of key value pairs. The utility involved in this invention is a client enabled Document Object Model (DOM) written in Java Script. The utility knows nothing about the type of data it handles, except that it holds a set of key value pairs. The Java script generation routine blindly "walks" the database data tree and requests each object for its key value. It then creates a String representation of the data and includes it in every page sent down to the client.

The data handling must provide a mechanism that allows the client to modify or add or remove data form the database. This invention solves this problem by using a generic set of commands and a generic, data-neutral, data addressing or assignment scheme that would allow all data to be treated opaquely.

The commands have the purpose of being sent from the client to the server via a single HTTP request. Within that request is a single request parameter named "commands" which has one long string parameter which is the concatenated set of commands that the client is requesting the server to execute. Each command request string may contain any number of commands.

Individual commands within the "commands" string are of the form: verb(parameter1, . . . ,parameterN). Typically commands take one or more parameters. This is not a limitation of the command language, however, as the language provides the flexibility for the client to provide an arbitrary number of parameters to these commands. The "expected" parameters will be operated on as described below and the additional parameters will simply be ignored. The power of the variable command feature comes into play if the server-side model object "target" object provided in the command implements a "get( )" or "set( )" method which takes the same number and type of parameters as specified in the command, in which case that method will be invoked in favor of the default command processing, allowing model objects to override default data manipulation and provide their own, perhaps richer, data manipulation action(s).

For a model object to override the default action processing of the command facility, it need only implement a "getSomeAttributeName( )" and or a "setSomeAttributeName( )" method, where "AttributeName" is the same as the attribute name specified in the "target" of the command, and where the model object is the target of the command.

Additional commands are also provided which allow the client to do more than simply manipulate data on the server. These additional commands actually enable the client to manipulate the server itself. These special, non-data-oriented commands allow the client to instruct the server to perform certain tasks such as perform a browser redirect, or print a message to an error log, etc.

Finally, the command syntax also provides a mechanism for the client to mark certain pieces of data as unknown by inserting tokens e.g. "@FooBar@", in place of the data. In this case the client expects that when the server sees these tokens it replaces the tokens via the SXClientCommand API with dynamically generated values on the server side. One example of this in HTTP is the uploading of a file, and the assignment of the filename to a server-side model object because the client does not know, at request submission time, what the final server side filename is because, for example, the server may need to rename the file to avoid collisions In this case the client sends up an "assign" command with a token that had been agreed upon with the server, e.g. @FielnameGoesHere@. When the server is about to tell the "commands" in the current request to "perform", it can first use SXClientCommand API to replace the token with the upload file's server-side name. The specific command syntax, the addressing scheme to refer to data within the commands and some examples of what some actual commands look like are shown in FIG. 3. For these "Client Command" objects to be executed without knowledge of the types of data they contain, a generic addressing scheme was created and is employed such that the client can formulate complex action requests in a chain.

In a particular implementation of the invention, a command model object called "SXPersistentPropertyHolder" is used which represents the "opaque bag" of data stored on the server and sent to the client. In this implementation, the only types of data the command processor understands are SXPersistentPropertyHolder, Hash Map, and Aray List.

To transport the modified instructions of the HTTP protocol, the invention invokes commands that allow the client to create instructions for the middleware to operate on data without the middleware needing to know the internals of that data. After executing the commands and making the appropriate modifications to the data, the middleware blindly hands the modified data off to the database.

These commands are passed from the client to the server via a HTTP "post" instruction. They are provided in a single HTTP string value bound to a "key" called "commands". When this HTTP request reaches the server, the server middleware examines the request and upon discovery of the commands, the server-side "Client Command" class parses the command string into its constituent data manipulation commands e.g. "move", "insert", "delete", thereby creating a unique "SXClient Command" object for each command, and then, one by one, tells each SXClient Command object to perform its action.

Although the invention for data transport and data manipulation emphasizes server logic to be ignorant of the type and form of client and database data, it nevertheless provides facilities to implement methods which overrides, and are invoked in place of the default command handling. This gives the server the ultimate power and flexibility in handling client data.

Additional commands are also provided which allow the client to do more than simply manipulate data on the server. These additional commands actually enable the client to manipulate the server itself. These special, non-data-oriented commands allow the client to instruct the server to perform certain tasks such as perform a browser redirect, or print a message to an error log.

The invention provides additional benefit of allowing the client to send changed data to the server without having the server cause a full page refresh on the client. The Figs. detail how the server blindly manipulates the "opaque" data using a generic addressing scheme as well as a command language and associated syntax for operating on the model objects.

Although the invention has been described in detail with reference to the particular preferred embodiments, persons possessing ordinary skill in the art to which this invention pertains will appreciate that various modifications and enhancements may be made without departing from the spirit and scope of the claims that follow.

The invention claimed is:

1. A method for handling data in a client-server computing environment, comprising the steps of:
    accepting the data from a user of a client in an opaque bag, wherein said bag comprises client data and self-contained manipulation code,
        wherein the client data comprises a key value pair having a key component and a value component provided by said client, wherein a value of said key value pair comprises current state of each datum,
        wherein said self-contained manipulation code uses a common vocabulary known to said client and a database;
    mapping an attribute of the client data to an owning model object using said common vocabulary; and
    storing the client data as database data in said database, wherein
    a server serving documents on a global telecommunications network to and from said client to said database;
    a middleware, being part of said server, acting as a blind conduit between said client and said database, wherein said middleware comprises both a data transfer component and a data manipulation component; and
    said data manipulation component of said middleware accepting commands from said client to operate on said data, said data transfer component of said middleware acting as said blind conduit, said data manipulation component having no knowledge of type or structure of said client data.

2. A method for handling data in a client-server computing environment, as in claim 1, further comprising matching said client data with database data for key value pairs.

3. A method for handling data in a client-server computing environment, as in claim 2, wherein said data handling uses a generic set of commands from said client to said server via at least a single HTTP request.

4. A method for handling data in a client-server computing environment, as in claim 3, wherein said data handling uses said generic set of commands, said commands comprising a format verb(parameter 1, parameter 2, . . . ).

5. A method for handling data in a client-server computing environment, as in claim 4, wherein said generic set of commands embeds any number of commands.

6. A method for handling data in a client-server computing environment, as in claim 5, wherein said generic set of commands embeds variable command feature.

7. A method for handling data in a client-server computing environment, as in claim 6, wherein said data handling invoking command "getSomeAttributeName( )" in favor of a default command processing.

8. A method for handling data in a client-server computing environment, as in claim 6, wherein said data handling invoking command "setSomeAttributeName( )" in favor of a default command processing.

9. A method for handling data in a client-server computing environment, as in claim 8, wherein said command enables said client to manipulate said server.

10. A method for handling data in a client-server computing environment, as in claim 8, wherein said command instructs said server to perform a browser redirect.

11. A method for handling data in a client-server computing environment, as in claim 8, wherein said command enables said client to manipulate said server and requests said server to print messages to an error log.

12. A method for handling data in a client-server computing environment, as in claim 8, wherein said command syntax providing a mechanism for the client to mark certain pieces of data as unknown by inserting tokens in place of real data.

13. A method for handling data in a client-server computing environment, as in claim 2, wherein said data handling is data neutral, said data handling comprising a data addressing scheme by which said data treated opaquely.

14. A method for handling data in a client-server computing environment, as in claim 1, wherein said client manipulates database data without having any knowledge of said type or structure of said client data.

15. A method for handling data in a client-server computing environment, as in claim 1, wherein the client, the middleware and the database handle the data without knowledge of said type or structure of said client data.

16. A method for handling data in a client-server computing environment, as in claim 1, further comprising the step of:
    transporting said client data, wherein said step of transporting matches said key value pair provided by said client to a key value pair stored in a server.

17. A method for handling data in a client-server computing environment, as in claim 16, wherein said step of mapping uses a map stored at a server side location.

18. A method for handling data in a client-server computing environment, as in claim 17, wherein said map is provided in a single location of said server side location.

19. An apparatus for handling data in a client-server computing environment, comprising:
    a client for accepting the data from a user in an opaque bag, and parsing modified data as client data,
        wherein said bag comprises client data and self-contained manipulation code,
        wherein the client data comprises a key value pair having a key component and a value component provided by said client, wherein a value of said key value pair comprises current state of each datum,
        wherein said self-contained manipulation code uses a common vocabulary known to said client and a database, and wherein an attribute of the client data is mapped to an owning model object using said common vocabulary;

said database for storing the client data as database data;

a server serving client data to and from said client to said database on Internet; and a middleware, wherein said middleware comprises:

a data transfer component, wherein said data transfer component comprises a blind conduit between said client and said database; and a data manipulation component operationally separate from said data transfer component, wherein said client manipulating said database data without knowledge of a type or structure of said client data; and wherein said middleware accepting commands from said client to operate on said data without knowledge of said type or structure of said client data.

20. An apparatus for handling data in a client-server computing environment, as in claim 19, wherein said middleware is a part of said server.

* * * * *

UNITED STATES PATENT AND TRADEMARK OFFICE
CERTIFICATE OF CORRECTION

| | | |
|---|---|---|
| PATENT NO. | : 7,158,982 B2 | Page 1 of 1 |
| APPLICATION NO. | : 10/203050 | |
| DATED | : January 2, 2007 | |
| INVENTOR(S) | : Keith Bernstein and Robert Kieffer | |

It is certified that error appears in the above-identified patent and that said Letters Patent is hereby corrected as shown below:

Title Page
ADD SECTION -- (60) RELATED U.S. APPLICATION DATA:

Provisional Application No. 60/180,393, filed on Feb. 04, 2000--.

Signed and Sealed this

Seventh Day of October, 2008

JON W. DUDAS
*Director of the United States Patent and Trademark Office*